(12) United States Patent
Chodorow

(10) Patent No.: US 12,186,146 B2
(45) Date of Patent: Jan. 7, 2025

(54) GRIPPING ELEMENT FLOSS

(71) Applicant: Sacks Holdings, Inc., San Diego, CA (US)

(72) Inventor: Devin S. Chodorow, San Diego, CA (US)

(73) Assignee: Sacks Holdings, Inc., San Diego, CA (US)

( * ) Notice: Subject to any disclaimer, the term of this patent is extended or adjusted under 35 U.S.C. 154(b) by 0 days.

(21) Appl. No.: 18/156,147

(22) Filed: Jan. 18, 2023

(65) Prior Publication Data
US 2023/0363869 A1 Nov. 16, 2023

Related U.S. Application Data

(63) Continuation of application No. 16/501,124, filed on Nov. 15, 2018, now Pat. No. 11,559,381.

(51) Int. Cl.
*A61C 15/04* (2006.01)

(52) U.S. Cl.
CPC .......... *A61C 15/042* (2013.01); *A61C 15/046* (2013.01)

(58) Field of Classification Search
CPC ... A61C 15/046; A61C 15/045; A61C 15/042; A61C 15/041; A61C 15/04; A61C 15/00
USPC .............................. 132/323–329; D28/65–68
See application file for complete search history.

(56) References Cited

U.S. PATENT DOCUMENTS

| | | | |
|---|---|---|---|
| 2,180,522 A | 11/1939 | Henne | |
| 4,016,892 A | 4/1977 | Chodorow | |
| 4,162,687 A | 7/1979 | Lorch | |
| 4,403,625 A | 9/1983 | Sanders et al. | |
| 4,638,824 A | 1/1987 | De La Hoz | |
| 5,086,792 A | 2/1992 | Chodorow | |
| 5,174,314 A * | 12/1992 | Charatan | A61C 15/043 132/321 |
| 5,435,330 A | 7/1995 | Dix | |
| D406,395 S | 3/1999 | Marin | |
| 5,911,229 A | 6/1999 | Chodorow | |
| 5,931,171 A | 8/1999 | Landis et al. | |
| 6,112,753 A | 9/2000 | Arsenault | |
| 6,397,853 B1 | 6/2002 | Lovick | |

(Continued)

FOREIGN PATENT DOCUMENTS

WO 2008098292 A1 8/2008

OTHER PUBLICATIONS

U.S. Appl. No. 16/501,124, Advisory Action, Mailed On Feb. 25, 2022, 3 pages.

(Continued)

*Primary Examiner* — Nicholas D Lucchesi
(74) *Attorney, Agent, or Firm* — Kilpatrick Townsend & Stockton LLP

(57) ABSTRACT

Embodiments of a floss strip and methods of using the same are disclosed herein. The floss strip can include a flossing filament. The flossing filament can have a first end and a second end. The flossing strip can include a first anchor coupled to the flossing filament at the first end of the flossing filament. The flossing strip can include a second anchor coupled to the flossing filament at the second end of the flossing filament. The flossing filament can couple the first and second anchors. The flossing strip can include a tensioning member attached to the flossing filament at an intermediate location between the first anchor and the second anchor.

20 Claims, 30 Drawing Sheets

(56) References Cited

U.S. PATENT DOCUMENTS

| | | | |
|---|---|---|---|
| 7,281,541 B2 * | 10/2007 | Lorch | A61C 15/041 132/321 |
| D637,762 S | 5/2011 | Nanda | |
| 8,297,290 B2 | 10/2012 | Hsu | |
| D681,879 S | 5/2013 | Stebila et al. | |
| 8,776,807 B2 | 7/2014 | Royzen | |
| D777,377 S | 1/2017 | Dudley | |
| 9,717,575 B2 | 8/2017 | Chodorow et al. | |
| 10,517,703 B2 | 12/2019 | Pines | |
| 10,856,958 B2 | 12/2020 | Wallström et al. | |
| 2004/0168703 A1 | 9/2004 | Cho | |
| 2005/0279377 A1 | 12/2005 | Sarjeant | |
| 2005/0288709 A1 | 12/2005 | Fallin et al. | |
| 2010/0018547 A1 | 1/2010 | Roemuss | |
| 2010/0107419 A1 | 5/2010 | Crisp | |
| 2012/0103356 A1 | 5/2012 | Crisp et al. | |
| 2012/0111348 A1 | 5/2012 | Prokopchuk et al. | |
| 2013/0025623 A1 | 1/2013 | Herzog | |
| 2014/0326274 A1 | 11/2014 | Kollar et al. | |
| 2015/0265383 A1 | 9/2015 | Pines et al. | |
| 2016/0067021 A1 | 3/2016 | Zwimpfer et al. | |
| 2020/0383694 A1 | 12/2020 | Jun et al. | |

OTHER PUBLICATIONS

U.S. Appl. No. 16/501,124, Final Office Action, Mailed On Sep. 7, 2021, 25 pages.

U.S. Appl. No. 16/501,124, Non-Final Office Action, Mailed On Mar. 24, 2022, 15 pages.

U.S. Appl. No. 16/501,124, Non-Final Office Action, Mailed On Jan. 4, 2021, 21 pages.

U.S. Appl. No. 16/501,124, Notice of Allowance, Mailed On Sep. 21, 2022, 6 pages.

* cited by examiner

GRIPPING ELEMENT FLOSS

CROSS-REFERENCE TO RELATED APPLICATION

The present application is a continuation of U.S. patent application Ser. No. 16/501,124, filed on Nov. 15, 2018, which is incorporated herein by reference.

BACKGROUND OF THE INVENTION

The present disclosure relates, generally, to dental devices, and more particularly to dental hygiene devices.

While dental hygiene has long been important in American and other cultures for maintaining a desirable physical appearance, recent discoveries have increased the urgency with which dental hygiene is maintained. These recent discoveries have linked oral bacteria to other, more serious disease such as, for example, heart disease. In light of the increased importance of dental hygiene, new devices are desired to improve dental hygiene.

BRIEF SUMMARY OF THE INVENTION

The present disclosure relates to a floss strip for oral hygiene. The floss strip includes: a flossing filament having a first end and a second end; a first anchor coupled to the flossing filament at the first end of the flossing filament; a second anchor coupled to the flossing filament at the second end of the flossing filament, the flossing filament coupling the first and second anchors; and at least one tensioning member attached to the flossing filament at an intermediate location between the first anchor and the second anchor.

In some embodiments, each of the first anchor and the second anchor includes a tab. In some embodiments, the first anchor comprises an integral pick. In some embodiments, the first anchor includes: a base coupling to the first end of the flossing filament; a terminus located opposite the base, a first edge extending between the base and the terminus, a second edge extending between the base and the terminus, a top, and a bottom. In some embodiments, each of the top and the bottom connect to each of: the base, the first edge, the second edge, and the terminus.

In some embodiments, the integral pick extends along at least a portion of the first edge from the base to the terminus. In some embodiments, the integral pick extends from a flex-channel in the first anchor to a point, the flex-channel extending at least partially from the second edge to the first edge. In some embodiments, the flex-channel is configured to allow flexing of the first anchor to expose the point of the integral pick.

In some embodiments, the tensioning member is displaceable along the flossing filament between the first anchor and the second anchor. In some embodiments, the tensioning member divides the floss strip into a first flossing segment and a second flossing segment. In some embodiments, the tensioning member is flexible. In some embodiments, the tensioning member includes a plurality of flexing features configured to allow flexing of the tensioning member. In some embodiments, the tensioning member includes a plurality of beads independently coupled to the floss strip. In some embodiments, the tensioning member includes a plurality spheres independently coupled to the floss strip. In some embodiments, the floss strip further includes a second tensioning member located between the tensioning member and the second anchor. In some embodiments, the floss strip can have a length between approximately 10 and 15 centimeters.

One aspect of the present disclosure relates to a floss strip for oral hygiene. The floss strip includes: a flossing filament having a first end and a second end; a first anchor coupled to the flossing filament at the first end of the flossing filament; and a second anchor coupled to the flossing filament at the second end of the flossing filament, the flossing filament coupling the first and second anchors.

In some embodiments, the first anchor is only connected to the second anchor via the flossing filament. In some embodiments, the first anchor includes a gripping portion and a tensioning portion. In some embodiments, the tensioning portion of the first anchor is flexible. In some embodiments, the tensioning portion of the first anchor includes at least one flexing feature. In some embodiments, the tensioning portion of the first anchor includes a plurality of peaks and valleys that can enable flexing of the tensioning member.

In some embodiments, each of the first anchor and the second anchor can be a tab. In some embodiments, the first anchor includes an integral pick. In some embodiments, the first anchor has: a base coupling to the first end of the flossing filament; a terminus located opposite the base, a first edge extending between the base and the terminus, a second edge extending between the base and the terminus, a top, and a bottom. In some embodiments, each of the top and the bottom connect to each of: the base, the first edge, the second edge, and the terminus.

In some embodiments, the integral pick extends along at least a portion of the first edge from the base to the terminus. In some embodiments, the integral pick extends from a flex-channel in the first anchor to a point. In some embodiments, the flex-channel extends at least partially from the second edge to the first edge. In some embodiments, the flex-channel allows flexing of the first anchor to expose the point of the integral pick. In some embodiments, the floss strip includes an exposed portion of the flossing filament, which exposed portion of the flossing filament extends from the first anchor to the second anchor. In some embodiments, each of the first anchor and the second anchor have a length of between 1.5 and 4 centimeters. In some embodiments, the exposed portion of the flossing filament has a length of between 2 and 4 centimeters.

One aspect of the present disclosure relates to a method of performing dental hygiene. The method includes: inserting a floss strip into a human mouth, the floss strip having: a flossing filament having a first end and a second end; a first anchor coupled to the flossing filament at the first end of the flossing filament; and a second anchor coupled to the flossing filament at the second end of the flossing filament, the flossing filament coupling the first and second anchors. The method includes independently controlling the first anchor and the second anchor to tension the flossing filament. In some embodiments, at least a portion of each of the first anchor and the second anchor are in the human mouth. The method includes flossing between teeth in the mouth with the flossing filament.

In some embodiments, the method includes deploying a pick, which pick can be, for example, an exposed pick or a protected pick, from the first anchor. In some embodiments, deploying the protected pick from the first anchor includes bending the first anchor to expose a point of the protected pick.

One aspect of the present disclosure relates to a method of performing dental hygiene. The method includes inserting a floss strip into a human mouth, the floss strip having: a flossing filament having a first end and a second end; a first anchor coupled to the flossing filament at the first end of the flossing filament; a second anchor coupled to the flossing filament at the second end of the flossing filament, the flossing filament coupling the first and second anchors; and a tensioning member attached to the flossing filament at an intermediate location between the first anchor and the second anchor. The method includes independently controlling the first anchor, the second anchor, and the tensioning member to tension the flossing filament. In some embodiments, at least a portion of the tensioning member is in the human mouth. The method includes flossing between teeth in the mouth with the flossing filament.

In some embodiments, controlling the tensioning member includes flexing the tensioning member. In some embodiments, the method includes displacing the tensioning member along the flossing filament to change a distance between the tensioning member and the first anchor. In some embodiments, the floss strip includes a second tensioning member located between the tensioning member and the second anchor.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

Figure 1:
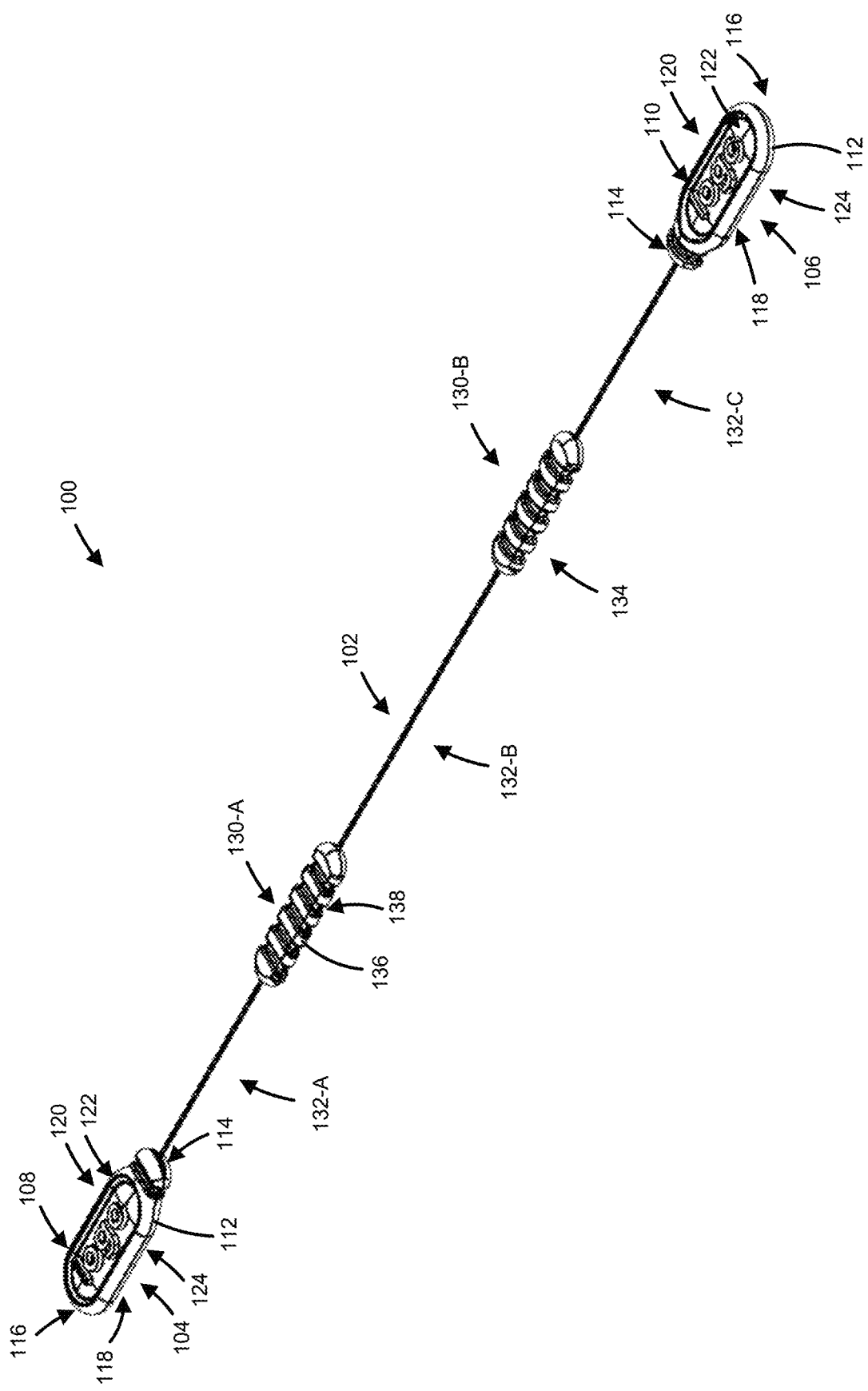
FIG. 1 is a perspective view of one embodiment of a floss strip.

In the appended figures, similar components and/or features may have the same reference label. Where the reference label is used in the specification, the description is applicable to any one of the similar components having the same reference label.

DETAILED DESCRIPTION OF THE INVENTION

In some embodiments, the present disclosure relates to a floss strip that can be used common some embodiments, for oral hygiene. The floss strip can be a linear member that includes a first anchor and a second anchor that are connected by a flossing filament, and in some embodiments that are only connected by a flossing filament. This flossing filament can comprise any lubricious fiber sufficiently strong and thin to be used for dental hygiene. In some embodiments, the flossing filament can comprise any dental floss including, for example, a waxed fiber such as a nylon or cotton fiber, a polytetrafluoroethylene (PTFE) fiber, a ultra-high-molecular-weight polyethylene (UHMPE) fiber, or any other fiber. In some embodiments, the flossing filament can comprise dental floss.

The floss strip can be sized, and specifically can have a length such that the user can hold the first anchor in one hand and the second anchor in another hand and tension the flossing strip to allow flossing of teeth throughout the user's mouth. In some embodiments, the floss can be sized, and of sufficient length such that the user can floss teeth throughout the user's mouth, while all or portions of one or both of the first and second anchors are in the user's mouth.

The floss strip can include features to allow the user to tension the flossing filament. In some embodiments, these features can be configured to allow the users to tension the flossing filament without directly contacting the flossing filament. These features can include, in some embodiments, flexible portions of anchors and/or one or several tensioning members. In some embodiments, for example, one or both of the first and second anchors can include a rigid portion and a flexible portion, the flexing of which flexible portion can tension the flossing filament. In some embodiments, the flossing strip can include one or several tensioning members that can be located along the flossing filament between the first anchor and the second anchor. In some particular embodiments, this can include a first tensioning member and the second tensioning member. The tensioning members can be fixed to the flossing filament such that the position of the tensioning members along the flossing filament is static. In some embodiments, the tensioning members can slide along the flossing filament to thereby change the position of one or more of the tensioning members with respect to the anchors.

In some embodiments, the floss strip improves flossing and flossing outcomes. For example, in traditional flossing, a user contacts the floss directly with the user's fingers by wrapping the flossing around the fingers. This direct contact of the finger to the floss can introduce contaminants and bacteria into the user's mouth, and particularly into the periodontal pockets and tissue surrounding the teeth. In addition to this, the wrapping of floss around a user's fingers can be uncomfortable and/or painful and can hamper blood flow to the user's fingertips. Floss strips, as disclosed herein resolve these shortcomings of traditional floss with a design that allows tensioning of the floss without direct contact of the user to the floss and that improve user comfort in flossing.

The floss strip can include one or several additional features that can be, in some embodiments, incorporated in one or both of the anchors and/or in the tensioning strip. In some embodiments, for example, floss strip can include one or more of: a toothpick, a tongue scraper, a gum stimulator, a soft pick, and interdental brush, or the like. In some embodiments, these additional features can be exposed, and in some embodiments, these additional features can be protected. In some embodiments, these additional features can be accessed via, for example, a bending of a portion of the floss strip such as, for example, the bending of the anchor in which one or more of these additional features are located.

FIG. 1 is a perspective view of one embodiment of a floss strip 100. The floss strip 100 can comprise a variety of shapes and sizes and can be made from a variety materials. In some embodiments, the floss strip 100 can comprise length between one and 9 cm, between 2 and 7 cm, between 3 and 6 cm, between 4 and 5 cm, or the like. The floss strip 100 includes a flossing filament 102 that has a first end 104 and a second end 106. The floss strip 100 further includes a first anchor 108 coupled to the first end 104 of the flossing filament 102, and the second anchor 110 coupled to the second end 106 of the flossing filament 102. The flossing filament 102 can, in some embodiments, couple the first anchor 108 and/or the second anchor 110. In some embodiments, the first end 104 of the flossing filament 102 can extend into and/or through the first anchor 108, and/or the second end 106 of the flossing filament 102 can extend into and/or through the second anchor 110.

In some embodiments, and as seen in FIG. 1, each of the first anchor 108, and the second anchor 110 can comprise a tab 112. As used herein, a "tab" refers to a portion of one of the anchors 108, 110 used for holding or manipulating the anchor 108, 110. The tab 112 can comprise: a base 114, a terminus 116, a first edge 118 extending from the base 114 to the terminus 116, a second edge 120 extending from the base 114 to the terminus 116, a top 122, and the bottom 124. In some embodiments, each of the top and the bottom can connect each of the base 114, the terminus 116, the first edge 118, and the second edge 120.

The floss strip 100 can include one or several tensioning members 130 that can be attached to the flossing filament 102, and an intermediate location between the first anchor 108 and the second anchor 110. In the embodiment of FIG. 1, the floss strip 100 includes a first tensioning member 130-A and the second tensioning member 130-B, which tensioning member is located between the first tensioning member 130-A and the second anchor 110

The tensioning members 130 can divide the flossing filament 102 into flossing segments 132, and specifically as shown FIG. 1, the first tensioning member 130-A second tensioning member 130-B can divide the flossing filament 102 into a first flossing segment 132-A, a second flossing segment 132-B, and a third flossing segment 132-C. In some embodiments, each of the segments 132 can comprise the same length, and in some embodiments, some or all of the segments 132 can comprise different lengths. In one embodiment, for example, the first flossing segment 132-A in the third flossing segment 132-C can have the same length, and the second flossing segment 132-B can have a different length.

The tensioning members 130 can comprise a variety of shapes and sizes, and the tensioning elements 130 and the anchors 108, 110 can be made from a variety materials. In some embodiments, the tensioning elements 130 and the anchors 108, 110 can comprise one or several polymers, ceramics, natural materials, metals, composite materials, and the like. In some embodiments, each of the tensioning elements 130, and the anchors 108, 110 can comprise a molded polymer such as, for example, an injection molded polymer.

In some embodiments, the tensioning members 130 can be flexible. In some embodiments, this flexibility can allow tensioning of the flossing filament 102, and/or of one or several flossing segments 132 of the flossing filament. In some embodiments, some or all of the tensioning elements 130 can comprise one or several flexing features 134, that can be configured to allow flexing of the tensioning member 130. In the embodiment depicted in FIG. 1, the flexing features 134 can comprise at least one, and more specifically a plurality of hills 136, and valleys 138. In some embodiments, these hills 136, and valleys 138, can facilitate flexing of the tensioning member 130.

In some embodiments, one or several of the tensioning members 130 can have a position fixed with respect to the flossing filament 102, and/or to the anchors 108, 110. In some embodiments, one or several the tensioning members 130 can be slidable along the flossing filament between, for example, the first anchor 108 in the second anchor 110. In some such embodiments, the sliding ability of one or more of the tensioning members 134, can facilitate sterile use of the floss strip 100 by preventing direct contact of the fingers of the user or of another to the flossing filament 102. Further the inclusion of the tensioning members 130 can eliminate the need to directly contact the floss to tension the floss and/or to wrap floss around the user's fingers to tension the floss.

In some embodiments, the floss strip 100 can have a configuration similar to that of FIG. 1, but the floss strip 100 can include a single anchor 108, a single tensioning member 130, and the floss flossing filament 102 can extend beyond the single anchor 108. In some embodiments, the portion of the flossing filament 102 extending beyond the single anchor 108, which portion of the flossing filament 102 comprises the second flossing segment 132-B, can have any desired length, including, for example, a length of up to 40 centimeters, a length of up to 30 centimeters, a length of up to 20 centimeters, a length between 2 and 20 centimeters, a length between 4 and 16 centimeters, a length between 10 and 15 centimeters, or a length of any other intermediate value or range.

Figure 2:
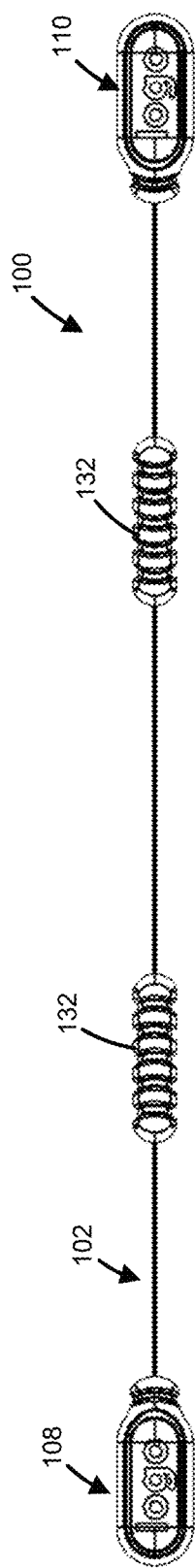
FIG. 2 is a top view of one embodiment of the floss strip.
Figure 3:
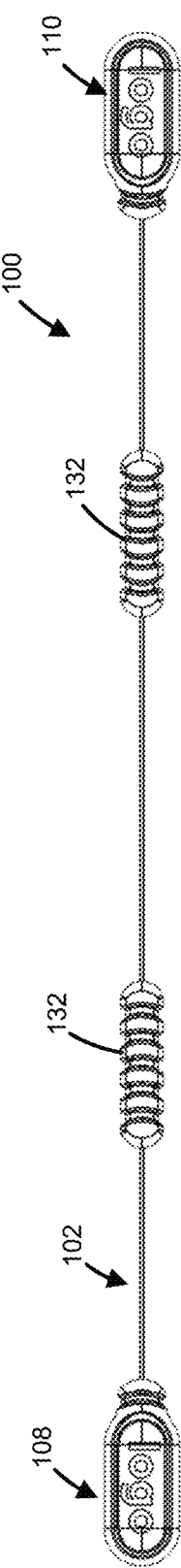
FIG. 3 is a bottom view of one embodiment of the floss strip.
Figure 4:
FIG. 4 is a front view of one embodiment of the floss strip.

With reference now to FIG. 2, a top view of one embodiment of floss strip 100 is shown. The floss strip 100 includes a flossing filament 102, a first end 108, second anchor 110, and tensioning members 130. With reference now to FIG. 3, a bottom view of one embodiment of the floss strip 100 is shown, and with reference now to FIG. 4, a front view of one embodiment of the floss strip 100 is shown.

Figure 5:
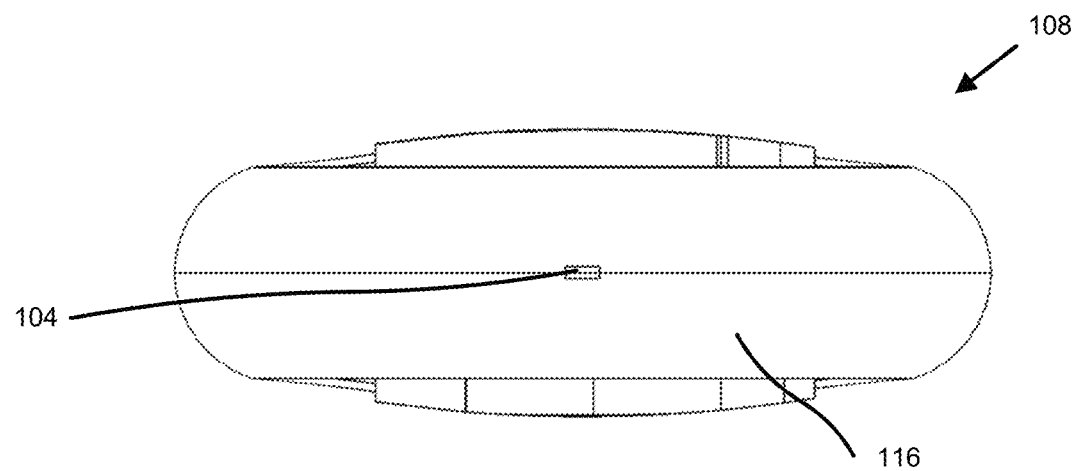
FIG. 5 is a left side view of one embodiment of the floss strip.
Figure 6:
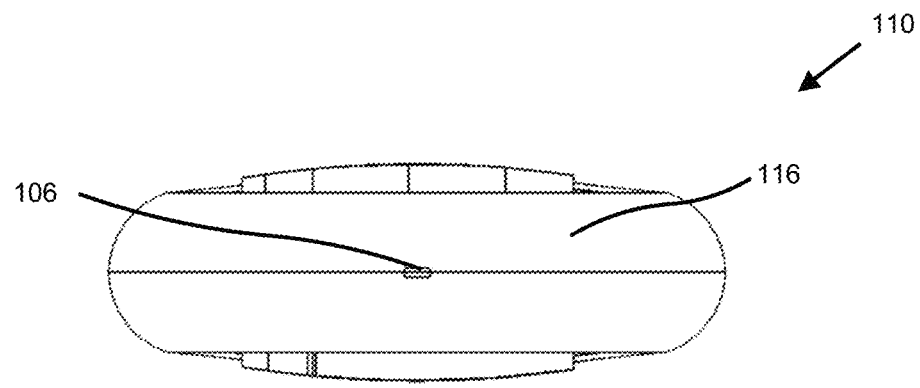
FIG. 6 is a right side view of one embodiment of the floss strip.

With reference now to FIG. 5, a left side view of the floss strip 100 is shown, and specifically of the first anchor 108 is shown. In the embodiment of FIG. 5, the first end 104 of the flossing filament 102 is visible in the terminus 116 of the first anchor 108. With reference now to FIG. 6, a right side view of the floss strip 100 is shown, and specifically of the second anchor 110 is shown. In the embodiment of FIG. 6, the second end 106 of the flossing filament 102 is visible in the terminus 116 of the second anchor 110.

Figure 7:
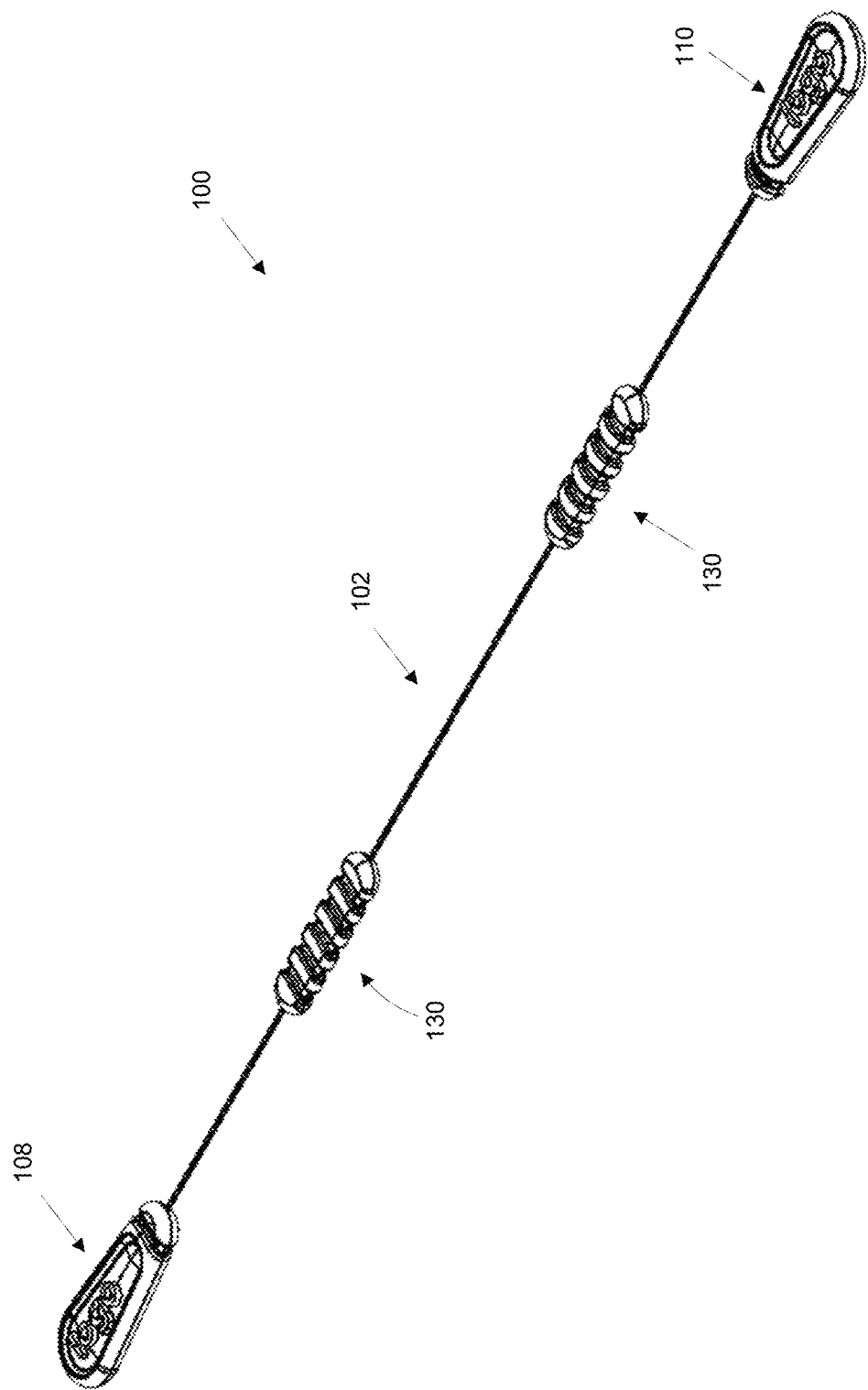
FIG. 7 is a perspective view of another embodiment of the floss strip.
Figure 8:
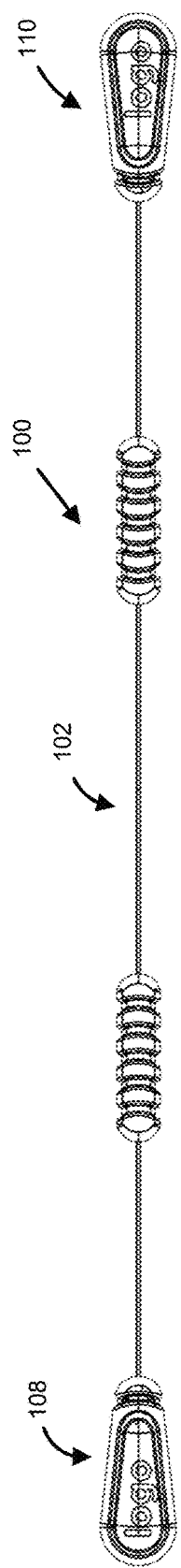
FIG. 8 is a top view of another embodiment of the floss strip.
Figure 9:
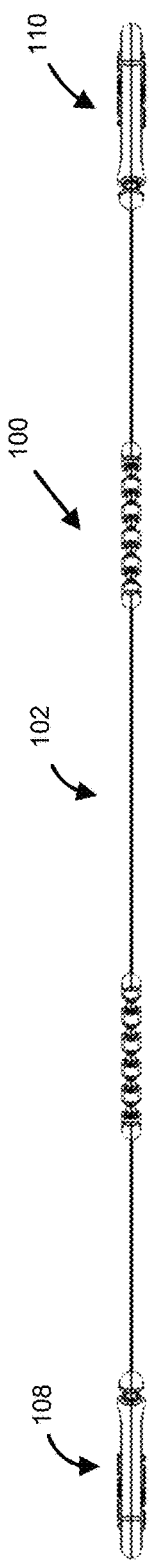
FIG. 9 is a front view of another embodiment of the floss strip.
Figure 10:
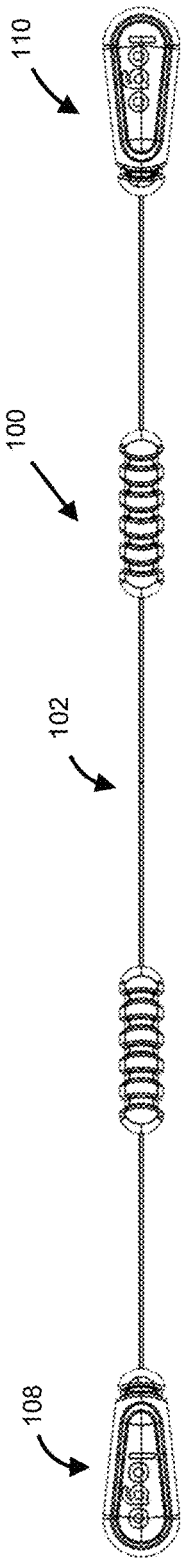
FIG. 10 is a bottom view of another embodiment of the floss strip.
Figure 11:
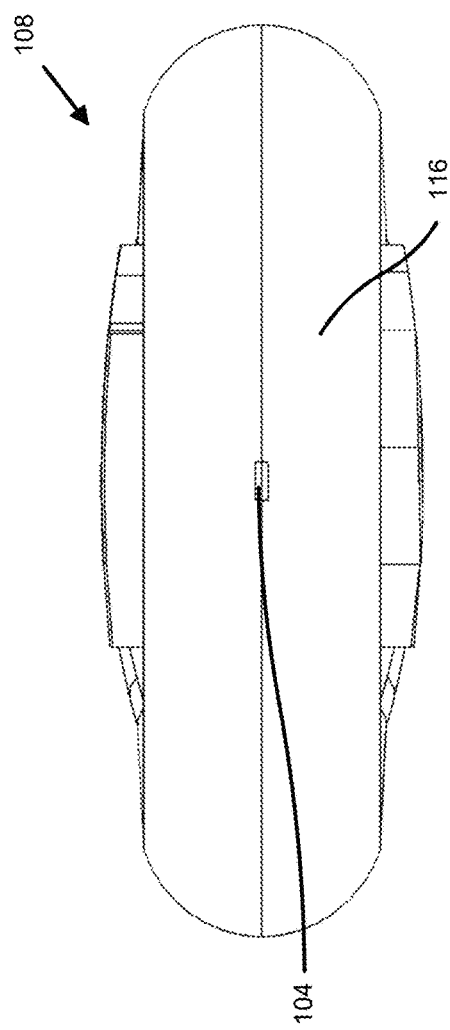
FIG. 11 is a left side view of another embodiment of the floss strip.
Figure 12:
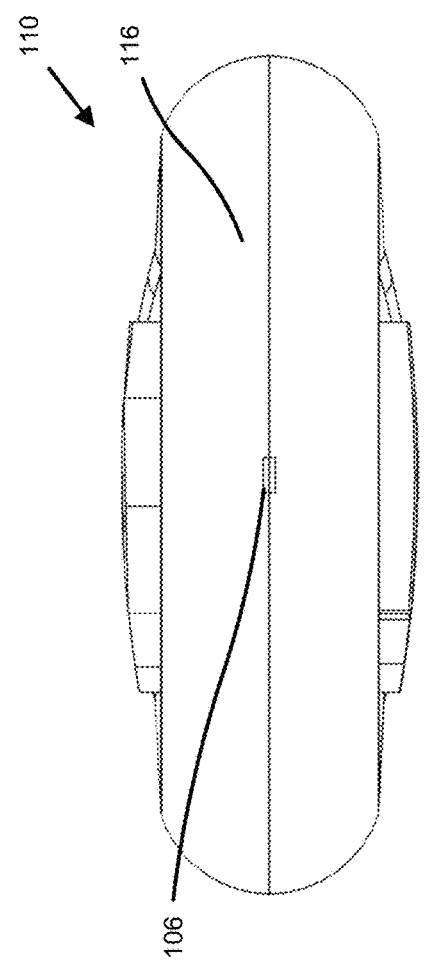
FIG. 12 is a right side view of another embodiment of the floss strip.

With reference now to FIGS. 7 through 12 another embodiment of a floss strip 100 is shown. FIG. 7 depicts a perspective view of the floss strip 100 including a flossing filament 102, a first anchor 108, a second anchor 110, and tensioning members 130. FIG. 8 is a top view of the floss strip 100, FIG. 9 is a front view of the floss strip 100, and FIG. 10 is a bottom view of the floss strip 100. FIG. 11 is a left side view of the floss strip 100, and FIG. 12 is a front side view of the floss strip 100. In some embodiments, and as depicted in FIGS. 7 through 12, the first anchor 108 is connected to the second anchor 110 via the flossing element 102, and in some embodiments, the first anchor 108 is connected to the second anchor 110 only via the flossing filament 102.

Figure 13:
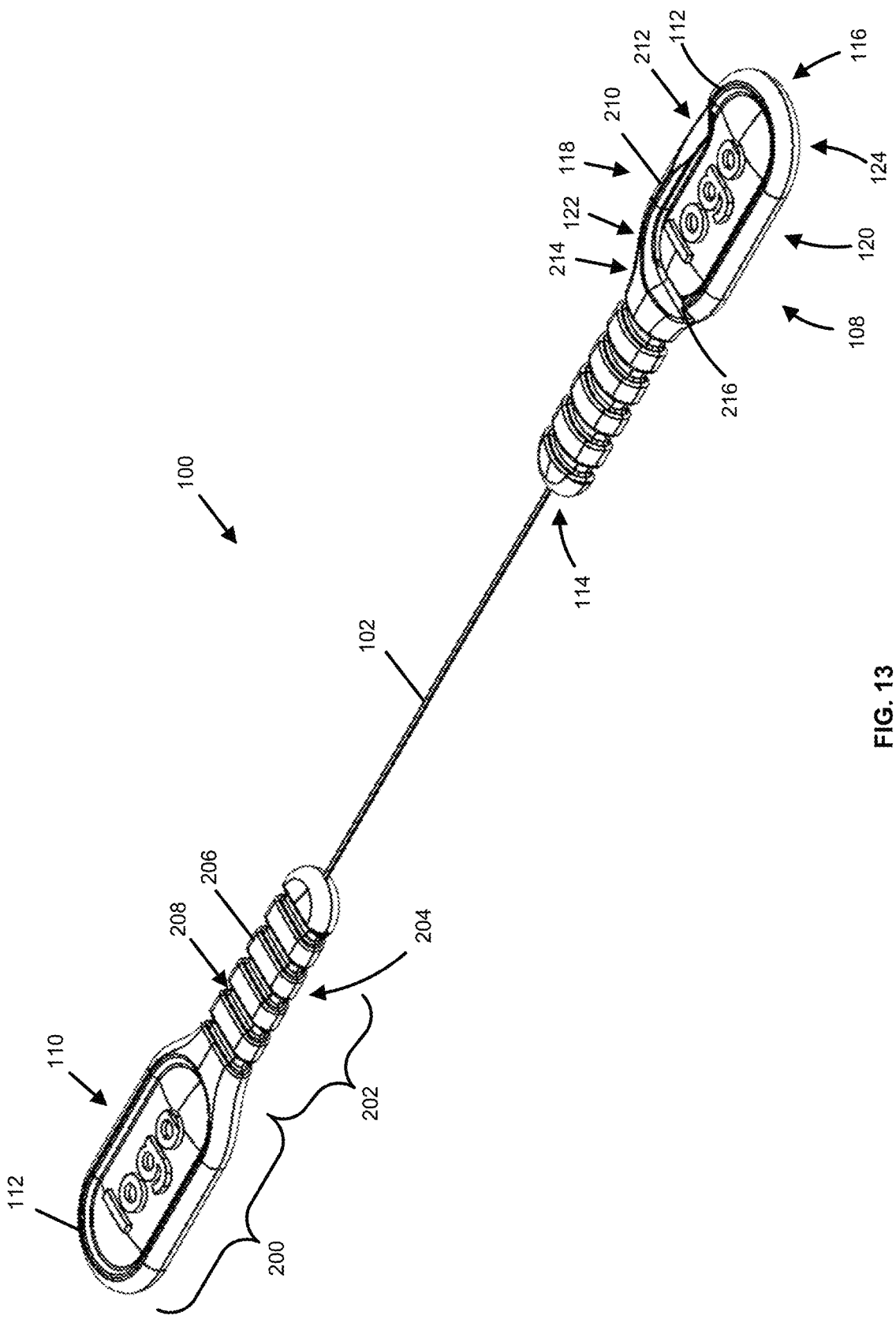
FIG. 13 is a perspective view of another embodiment of the floss strip.
Figure 14:
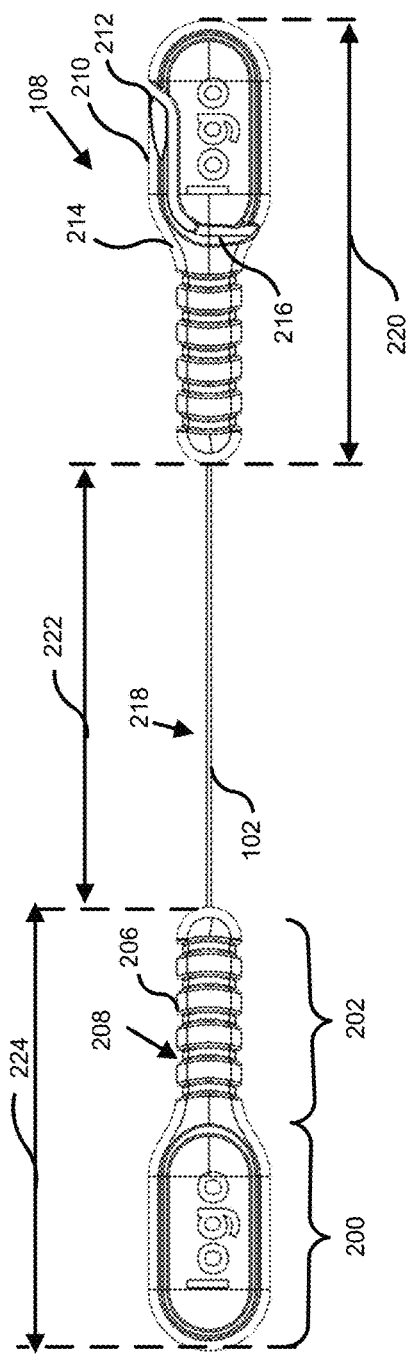
FIG. 14 is a top view of another embodiment of the floss strip.
Figure 15:
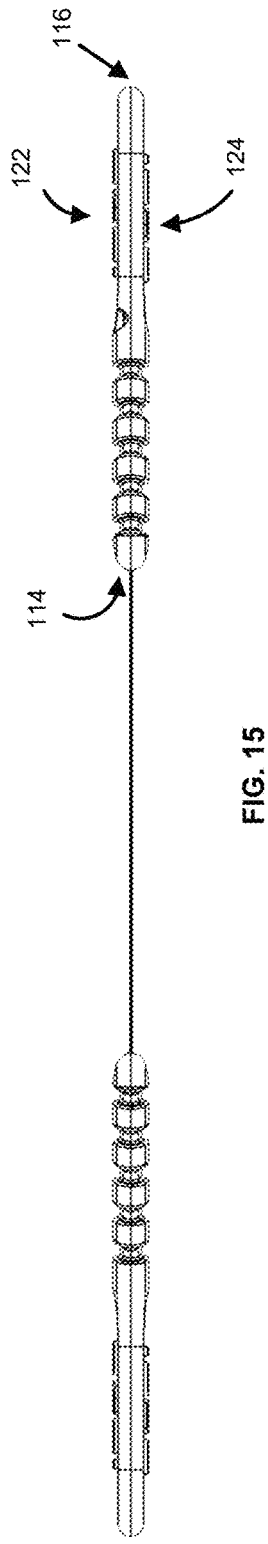
FIG. 15 is a front view of another embodiment of the floss strip.
Figure 16:
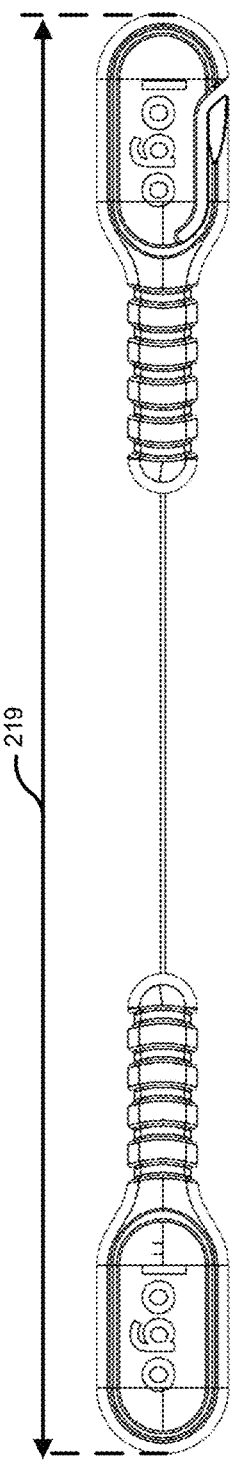
FIG. 16 is a bottom view of another embodiment of the floss strip.
Figure 17:
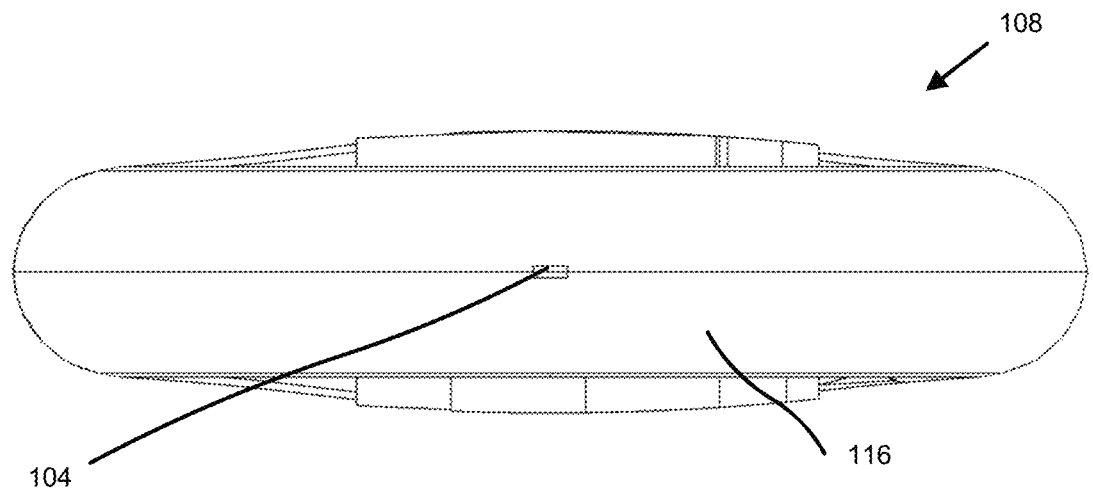
FIG. 17 is a left side view of another embodiment of the floss strip.
Figure 18:
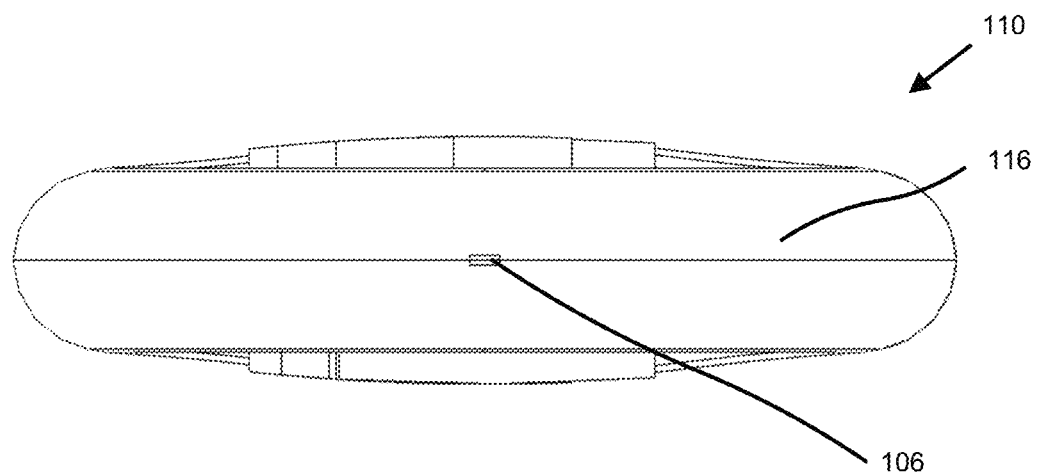
FIG. 18 is a right side view of another embodiment of the floss strip.

FIGS. 13 through 18 depict another embodiment of the floss strip 100. As shown in FIG. 13, the floss strip 100 includes a flossing filament 102, a first anchor 108, and a second anchor 110. Each of the first anchor 108, and the second anchor 110 can comprise a tab 112. The tab 112 can comprise: a base 114, a terminus 116, a first edge 118 extending from the base 114 to the terminus 116, a second end 120 extending from the base 114 to the terminus 116, a top 122, and the bottom 124. In some embodiments, each of the top and the bottom can connect each of the base 114, the terminus 116, the first edge 118, and the second edge 120.

In some embodiments, one or both of the first and second anchors 108, 110 can comprise a gripping portion 200 and a tensioning portion 202. The gripping portion 200 can be relatively more proximate to the terminus 116 of the anchor 108, 110, and the tensioning portion 202 can be relatively more proximate to the base 114 of the anchor 108, 110. In some embodiments, the tensioning portion 202 can be flexible to allow the tensioning of the flossing filament 102 via the flexing of the tensioning portion 202 of one of the anchors 108, 110.

In some embodiments, the tensioning portion 202 can include one or several flexing features 204 that can enable the flexing of the tensioning portion 202. In some embodiments, the flexing features 204 can comprise one or several ribs, peaks 206 and/or valleys 208, or the like. In some embodiments, the peaks 206 and valleys 208 of the tensioning portion 202 of the anchor 108, 110 enable flexing of the tensioning member 202.

In some embodiments, one or both of the anchors 108, 110 can comprise a pick 210, such as an exposed pick or a protected pick (shown in FIG. 13), having a point 212 and a pick-base 214. In some embodiments, the pick 210 can comprise an integral pick. The pick can extend along at least a portion of the first edge 118 from the base 114 to the terminus 116 and/or from a position relatively more proximate to the base 114 to a position relatively less proximate to the base 114. In some embodiments, the pick 210 extends from a portion of the anchor 108, 110 to the point 212, and specifically, in some embodiments, the pick 210 extends from a flex-channel 216 of the anchor to the point 212 of the pick 210. In the embodiment depicted in FIG. 13, the pick 210 extends from the pick-base 214 which is relatively more proximate to the base 114 of the anchor 108, 110 to a position relatively less distal to the base 114 of the anchor 108, 110.

In some embodiments, the anchor 108, 110 can comprise one or several features configured to allow deployment of the pick 210. In some embodiments, these features can include one or several features of the anchor 108, 110 configured to enhance flexibility of the anchor 108, 110. In one embodiment, for example, the anchor 108, 110 containing the pick 210 can comprise a flex-channel 216 located proximate to the pick-base 214 of the pick 210. The flex-channel 216 can, in some embodiments, allow bending of the anchor 108, 110 containing the pick 210 to deploy the pick 210, and specifically to deploy the point 212 of the pick 210. In some embodiments, the flex-channel 216 can extend at least partially from the second edge 120 to and/or towards the first edge 118, and the flex-channel can be configured to allow flexing of the anchor 108, 110 to expose the point 212 of the pick 210.

In some embodiments, the floss strip 100 can have a length 219 that can be divided into a length 220 of the first anchor 108, a length 224 of the second anchor 110, and a length 222 of an exposed portion 218 of the flossing filament 102. In some embodiments, floss strip 100 can comprise length between one and 9 cm, between 2 and 7 cm, between 3 and 6 cm, between 4 and 5 cm, or the like. In some embodiments, the floss strip 100 has a length such that the exposed portion 218 of the flossing filament 102 can be tensioned in the mouth of a user when all or portions of the first anchor 108 in the second anchor 110 are also in the user's mouth. In some embodiments, length 220 of the first anchor 108 and the length 224 of the second anchor 110 can be the same, and can be between, for example, 1 and 6 centimeters, between 1.5 and 4 centimeters, between 2 and three centimeters, and/or in any other or intermediate range. In some embodiments, the length 222 of the exposed portion 218 of the flossing filament 102 can be, for example, between 1 and 8 centimeters, between 2 and 6 centimeters, between 2 and 4 centimeters, and/or in any other or intermediate range. The floss strip 100 can have a total length, in some embodiments, between approximately 4 and 25 centimeters, between 6 and 20 centimeters, between 8 and 18 centimeters, and/or between 10 and 15 centimeters. Surprisingly, a floss strip 100 having a length between 10 and 15 centimeters enables tensioning of the flossing filament 102 in the user's mouth when all or portions of the first and second anchors 108, 110 are also in the user's mouth. This ability can advantageously facilitate improved flossing and can facilitate and maintain the sterility of the flossing filament 102.

Figure 19:
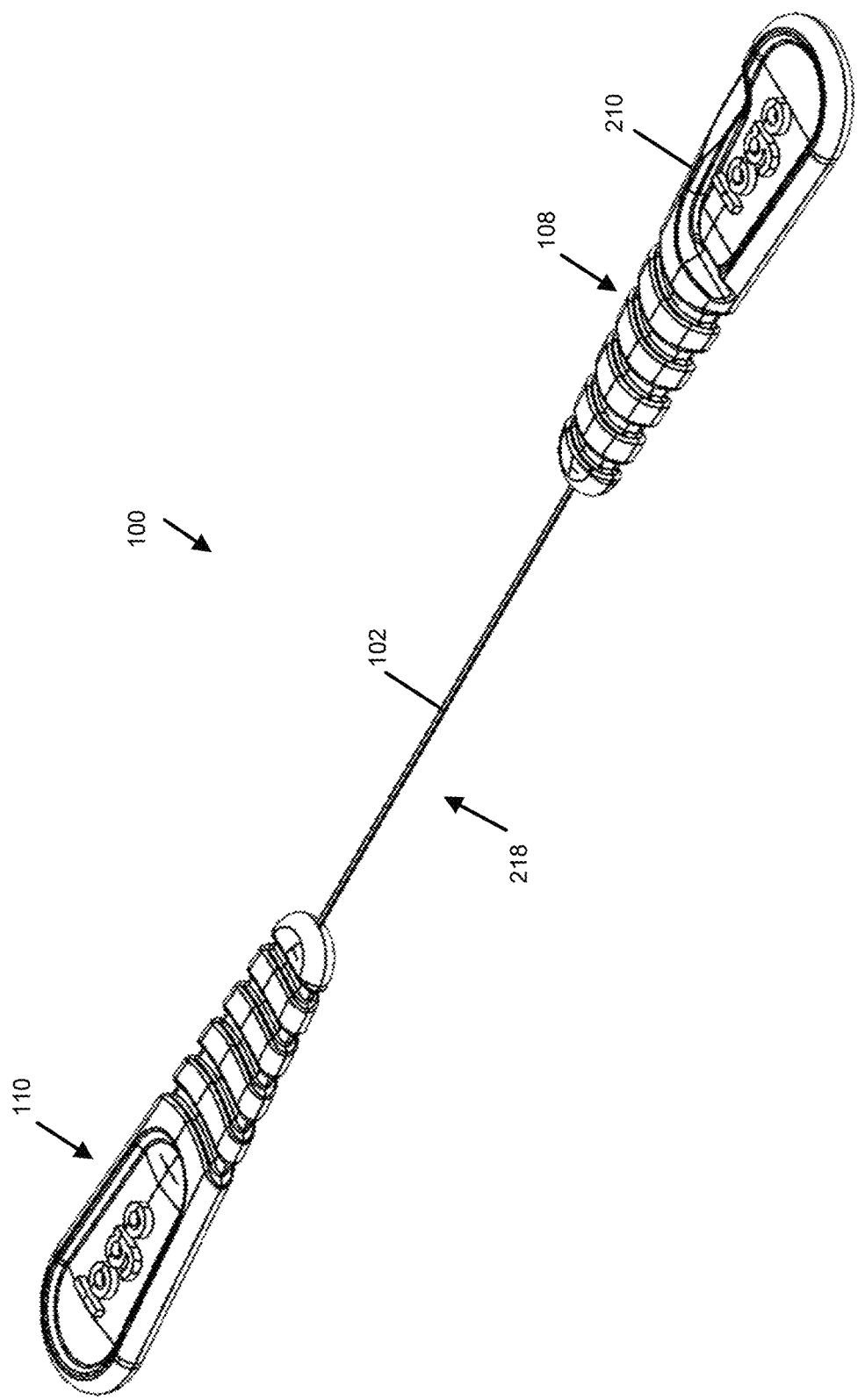
FIG. 19 is a perspective view of another embodiment of the floss strip.
Figure 20:
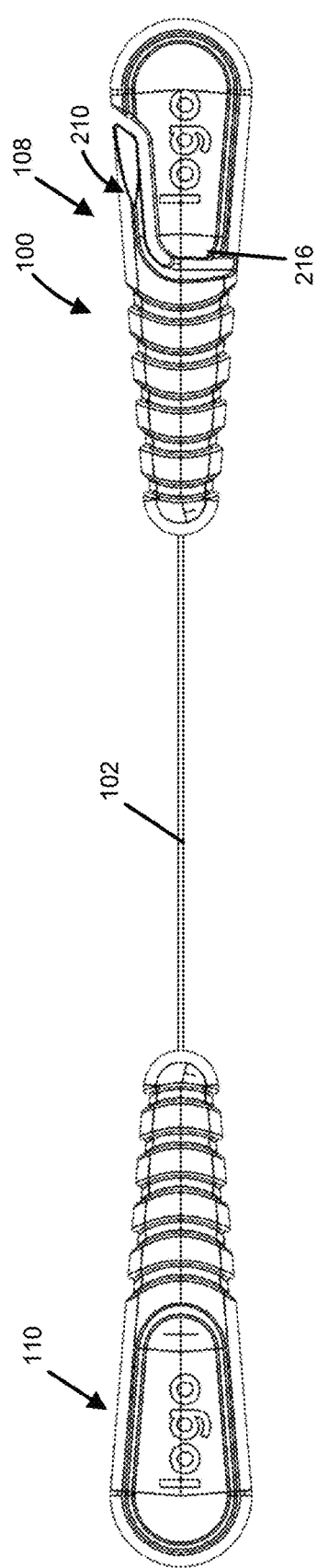
FIG. 20 is a top view of another embodiment of the floss strip.
Figure 21:
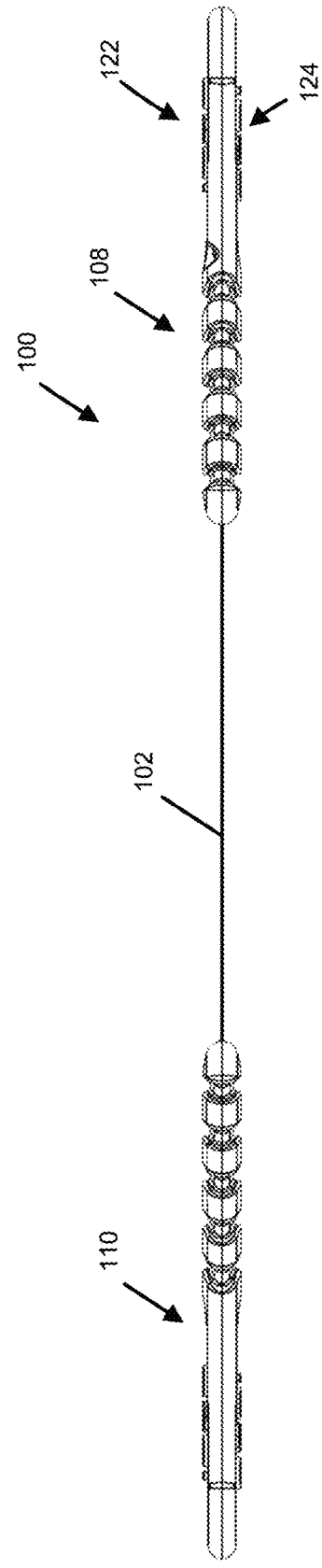
FIG. 21 is a front view of another embodiment of the floss strip.
Figure 22:
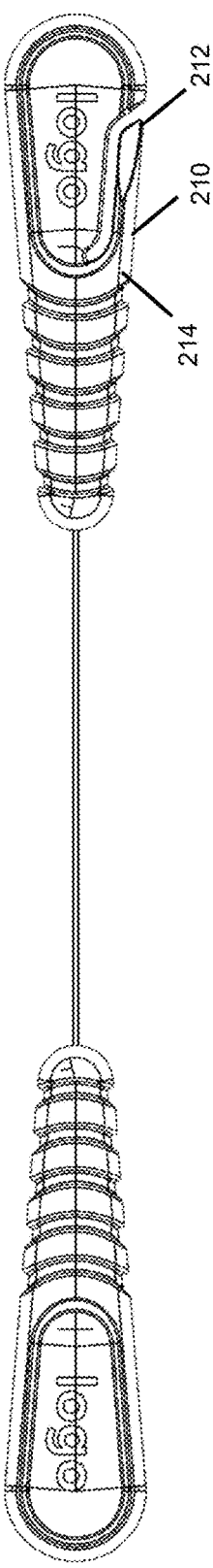
FIG. 22 is a bottom view of another embodiment of the floss strip.
Figure 23:
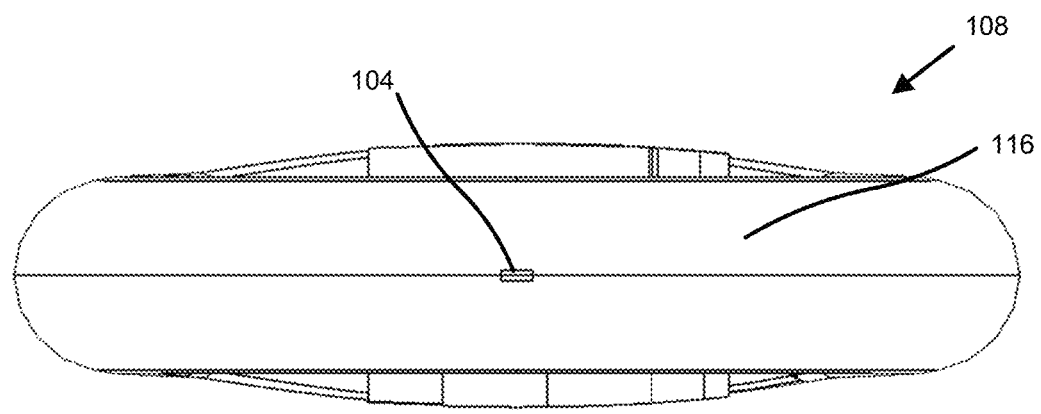
FIG. 23 is a left side view of another embodiment of the floss strip.
Figure 24:
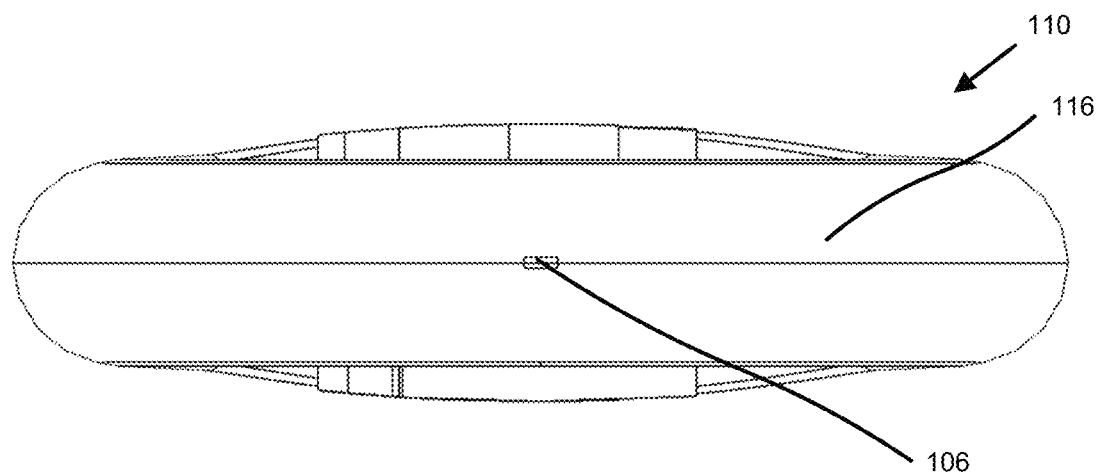
FIG. 24 is a right side view of another embodiment of the floss strip.
Figure 25:
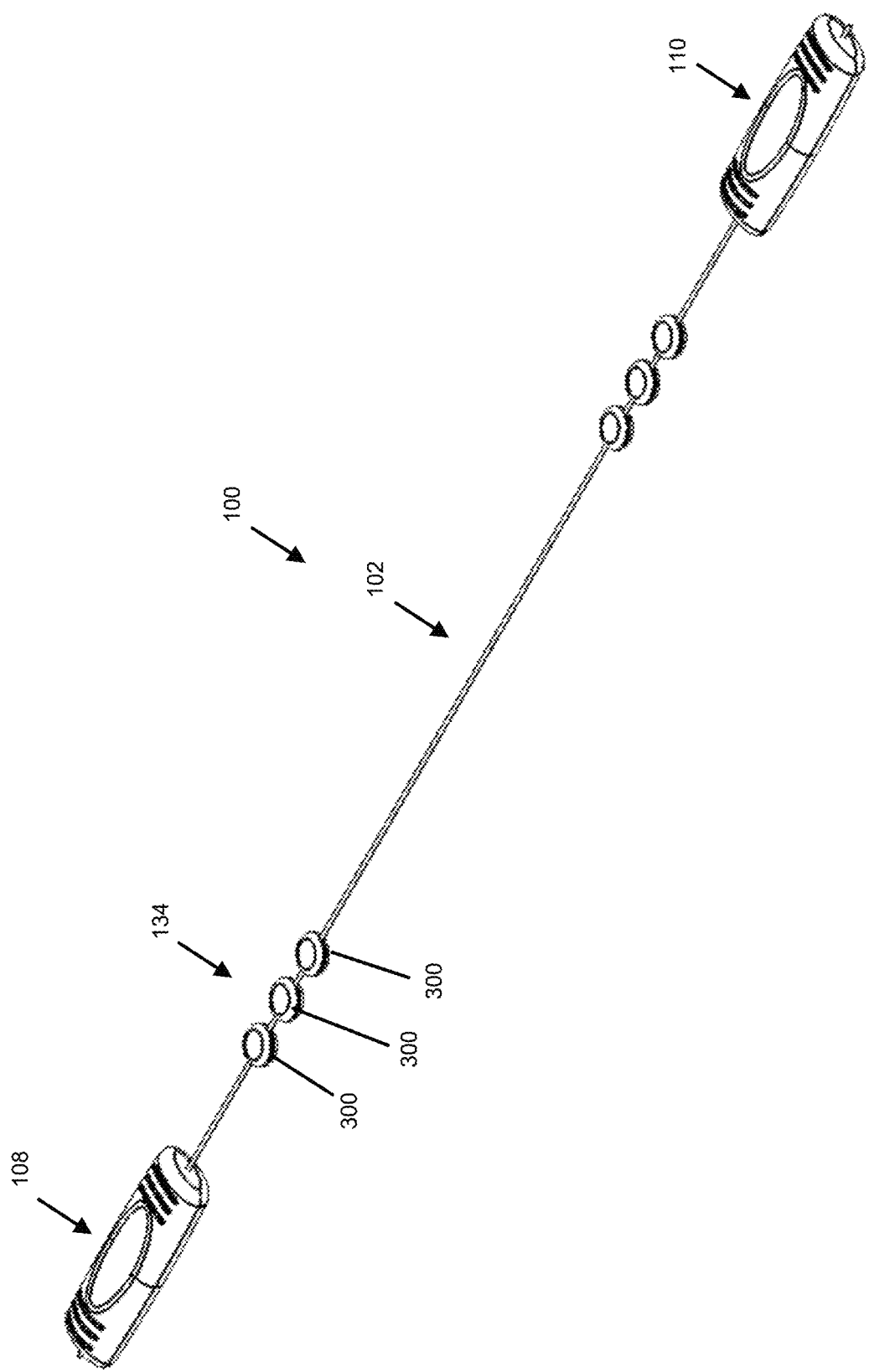
FIG. 25 is a perspective view of another embodiment of the floss strip.
Figure 26:
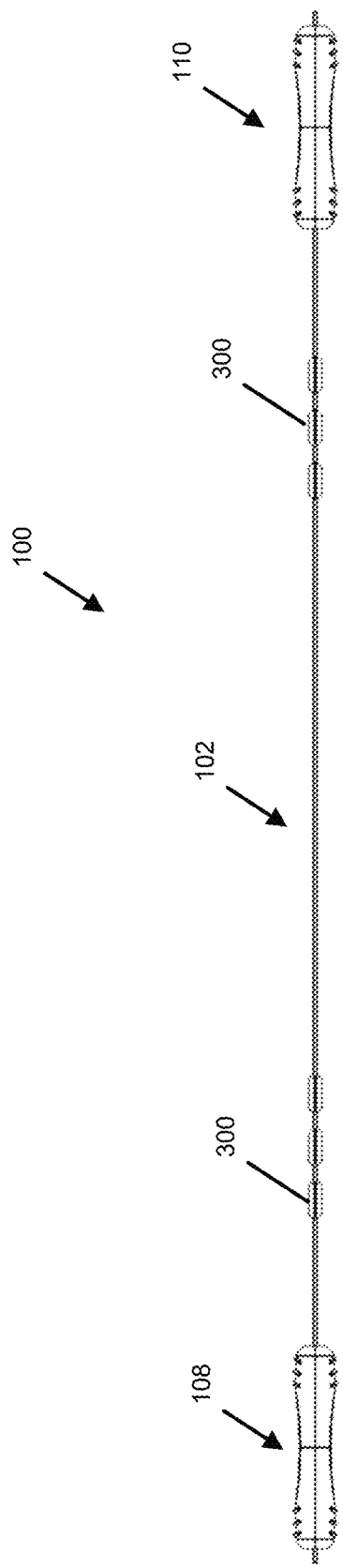
FIG. 26 is a front view of another embodiment of the floss strip.
Figure 27:
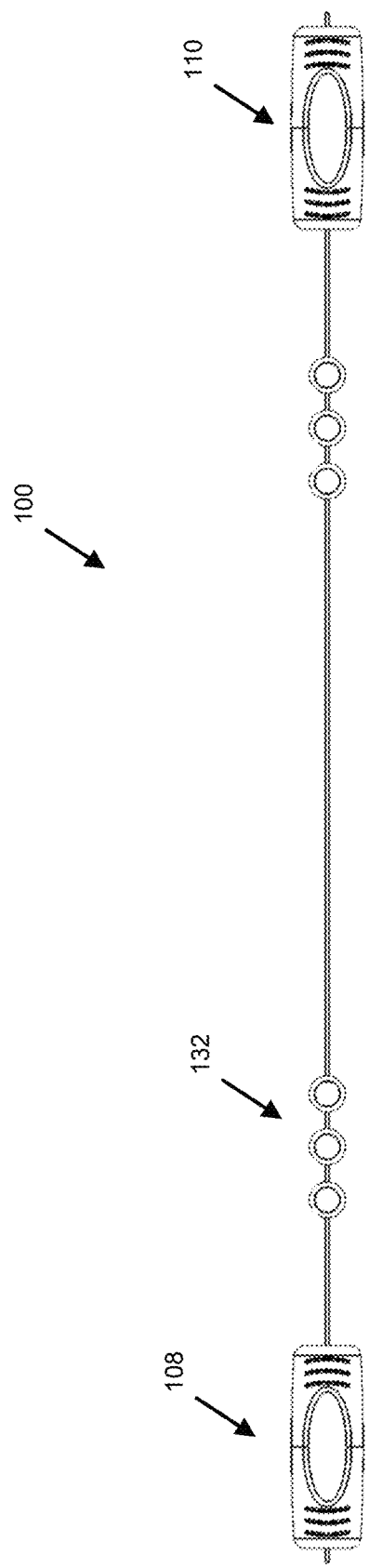
FIG. 27 is a top view of another embodiment of the floss strip.
Figure 28:
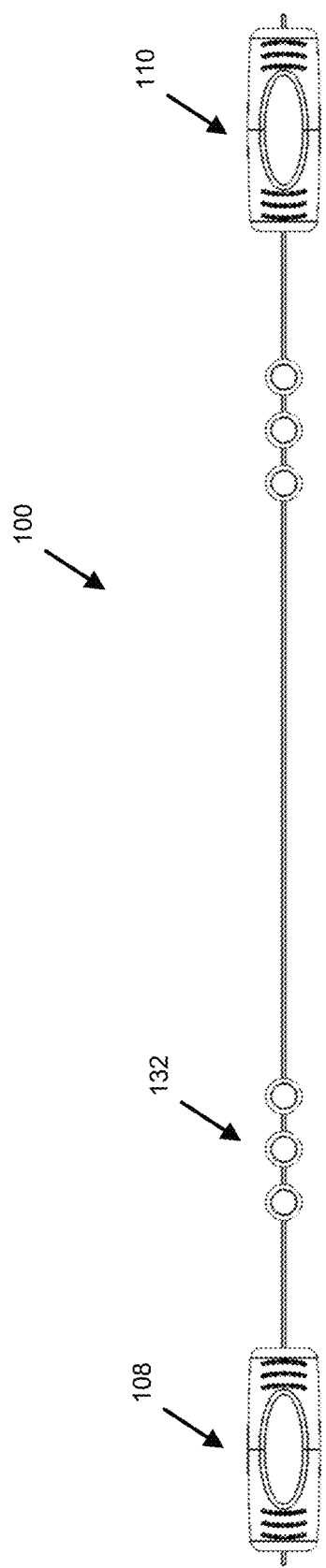
FIG. 28 is a bottom view of another embodiment of the floss strip.
Figure 29:
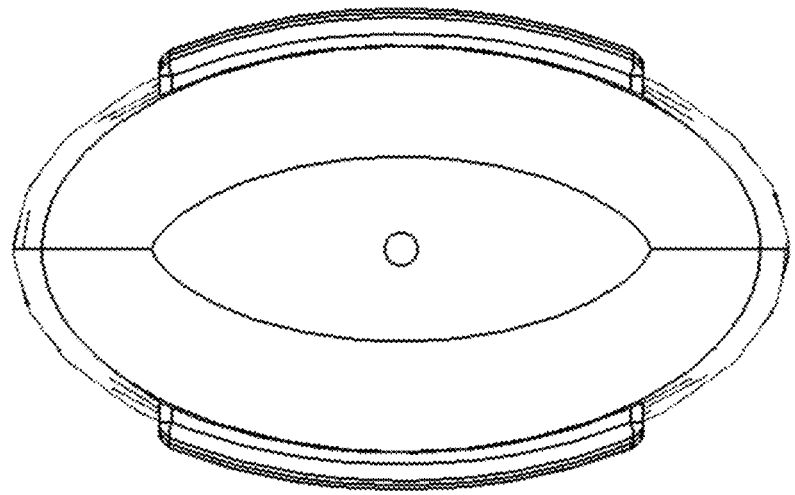
FIG. 29 is a left side view of another embodiment of the floss strip.
Figure 30:
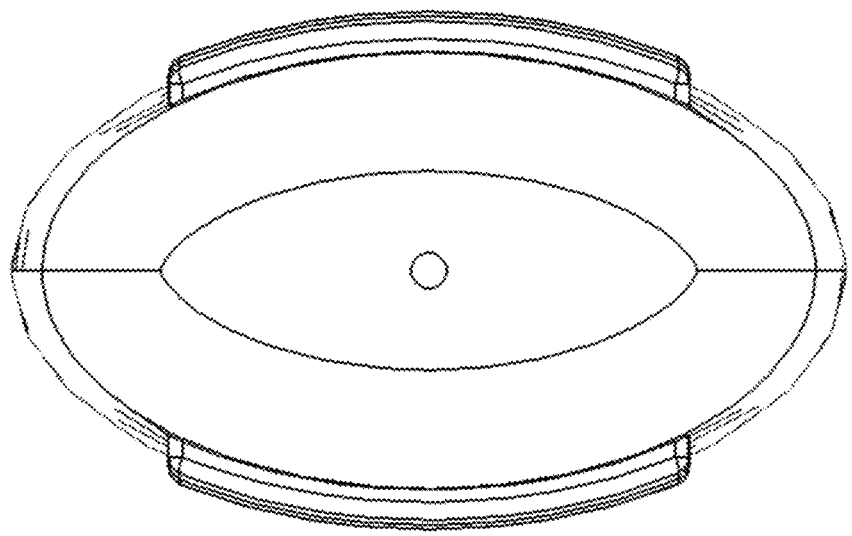
FIG. 30 is a right side view of another embodiment of the floss strip.
Figure 31:
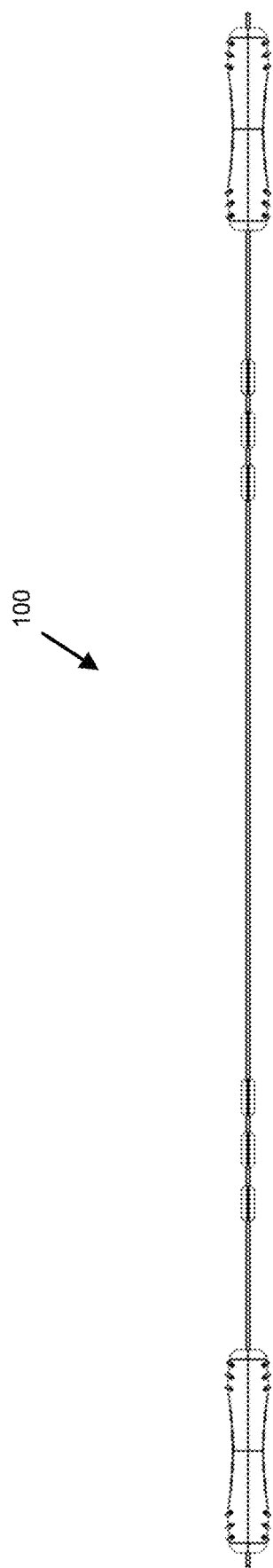
FIG. 31 is a back view of another embodiment of the floss strip.
Figure 32:
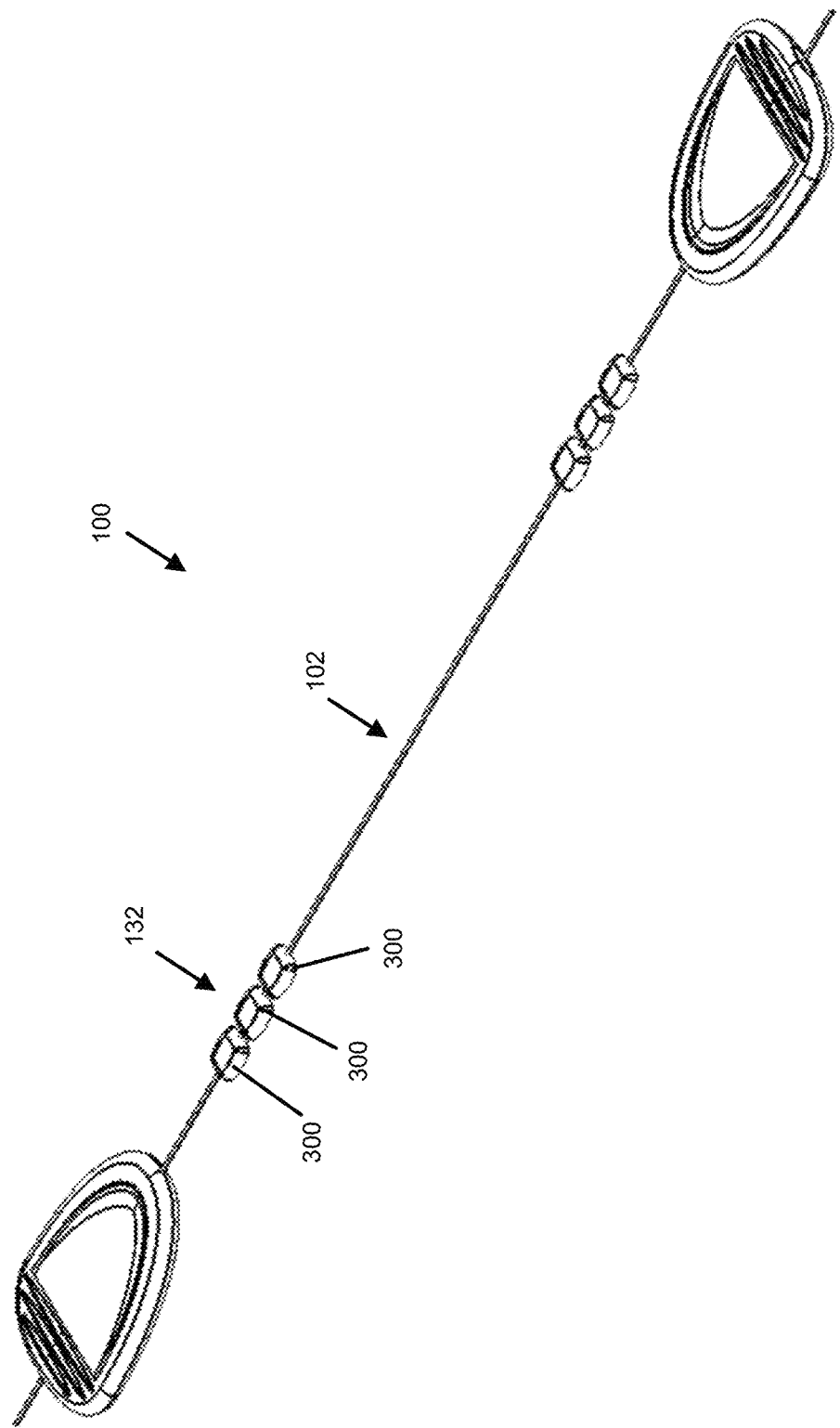
FIG. 32 is a perspective view of another embodiment of the floss strip.
Figure 33:
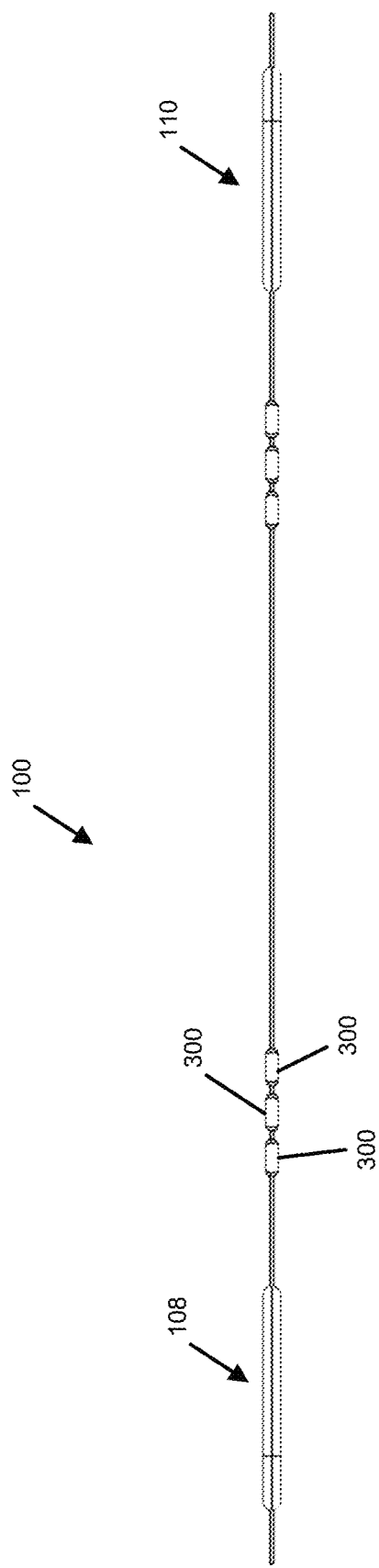
FIG. 33 is a front view of another embodiment of the floss strip.
Figure 34:
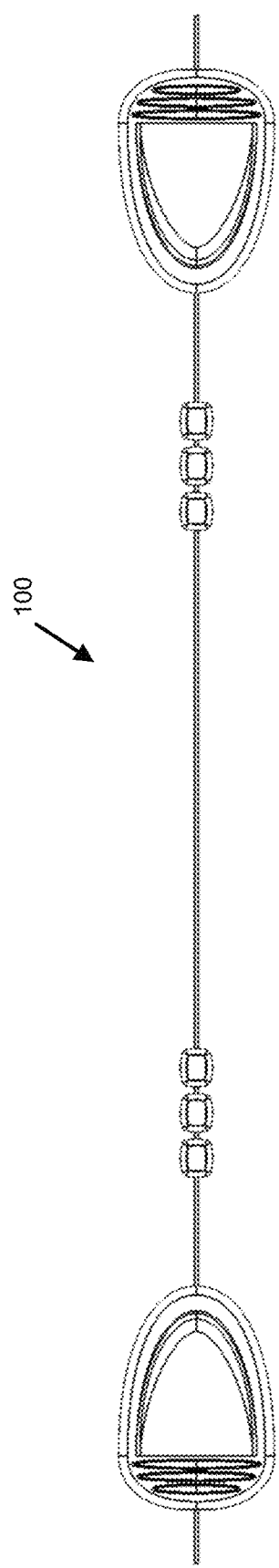
FIG. 34 is a top view of another embodiment of the floss strip.
Figure 35:
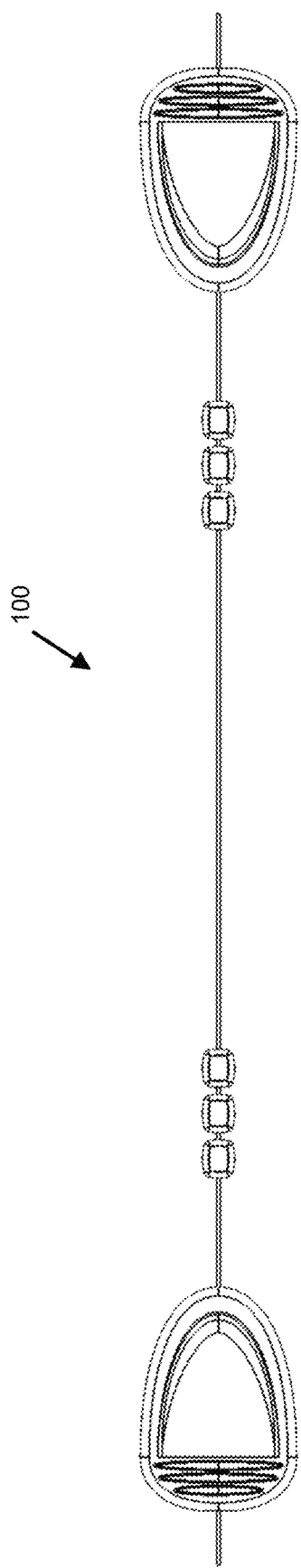
FIG. 35 is a bottom view of another embodiment of the floss strip.
Figure 36:
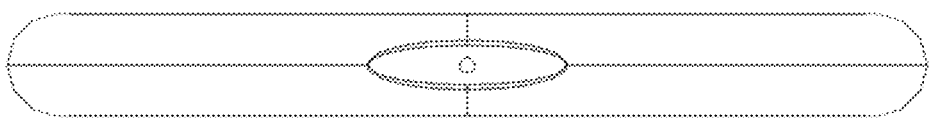
FIG. 36 is a left side view of another embodiment of the floss strip.
Figure 37:
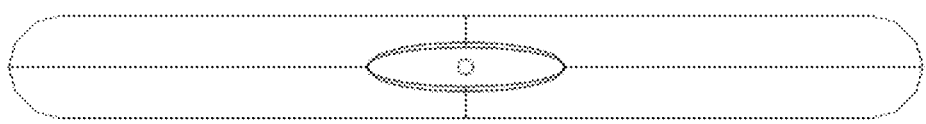
FIG. 37 is a right side view of another embodiment of the floss strip.
Figure 38:
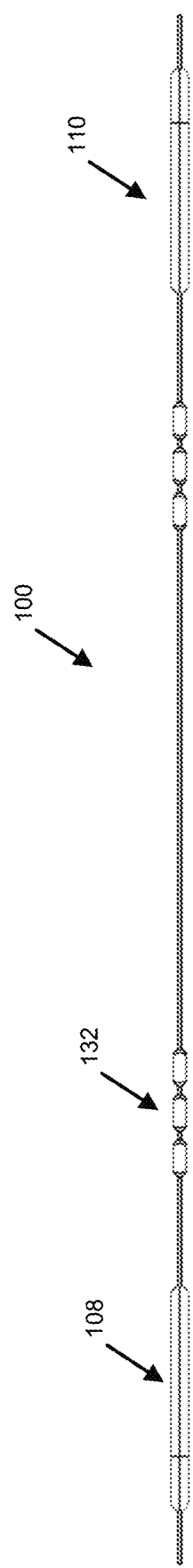
FIG. 38 is a back view of another embodiment of the floss strip.
Figure 39:
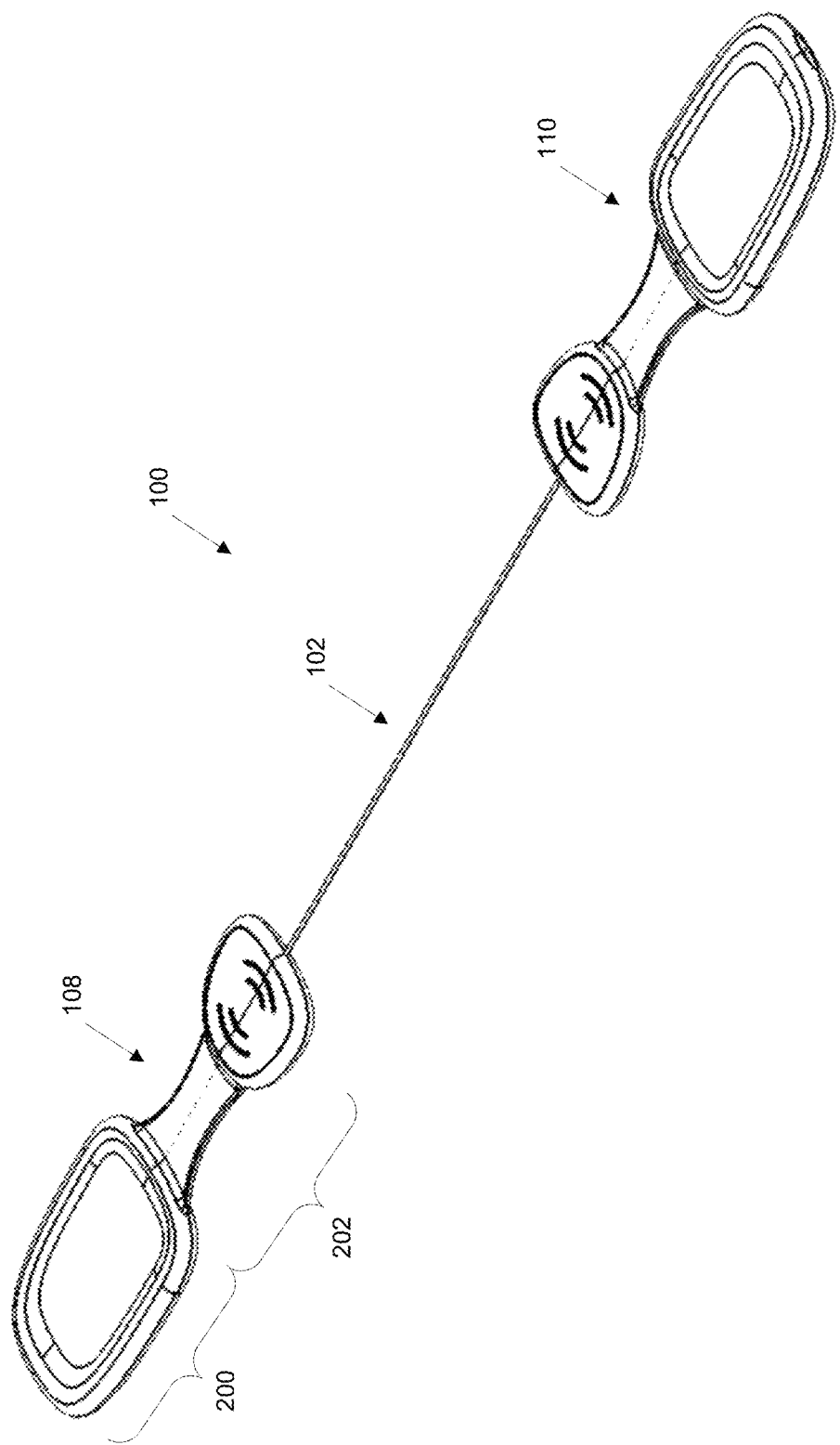
FIG. 39 is a perspective view of another embodiment of the floss strip.
Figure 40:
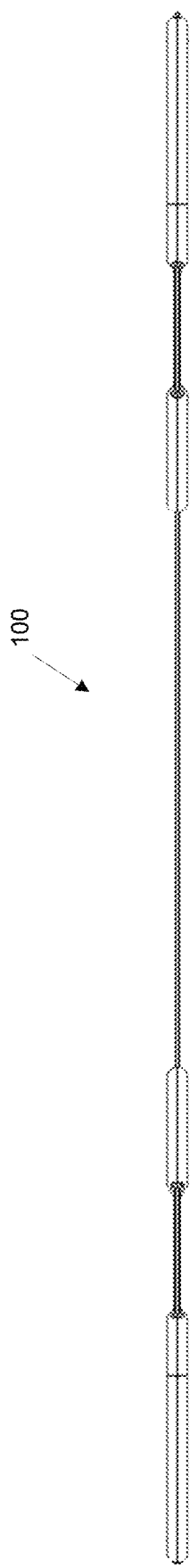
FIG. 40 is a front view of another embodiment of the floss strip.
Figure 41:
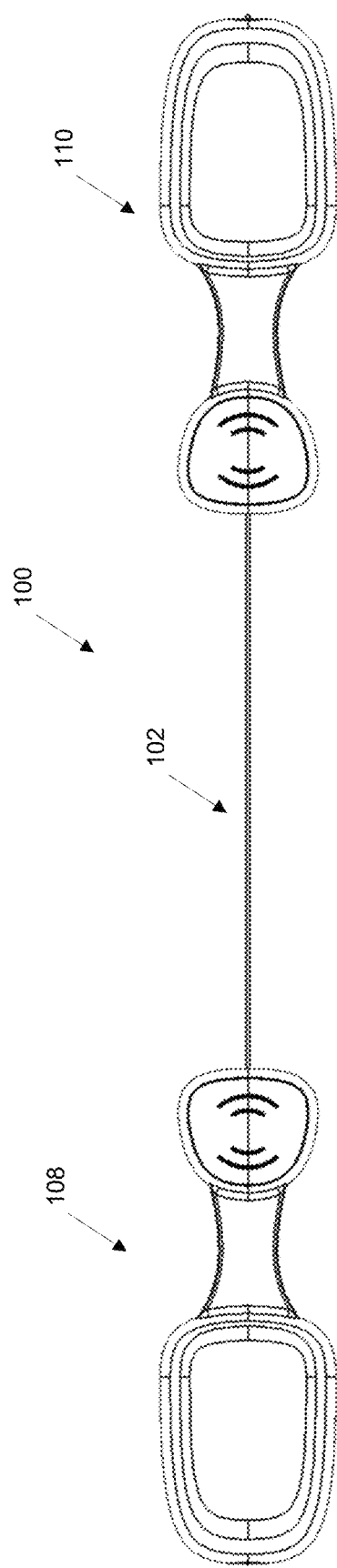
FIG. 41 is a top view of another embodiment of the floss strip.
Figure 42:
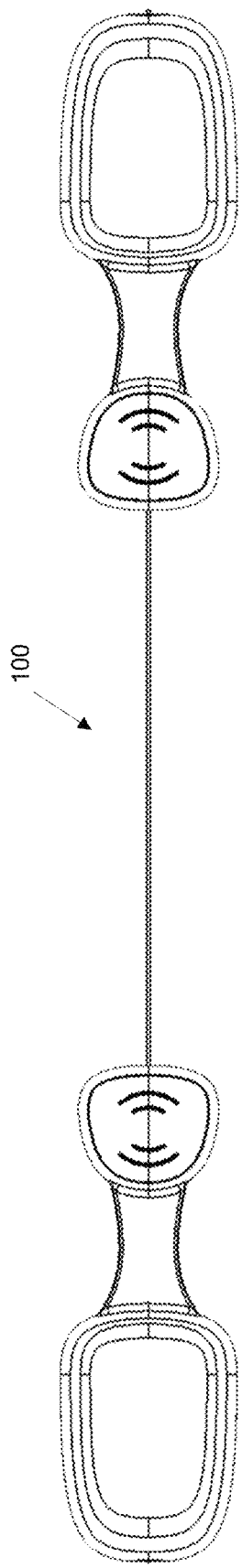
FIG. 42 is a bottom view of another embodiment of the floss strip.
Figure 43:
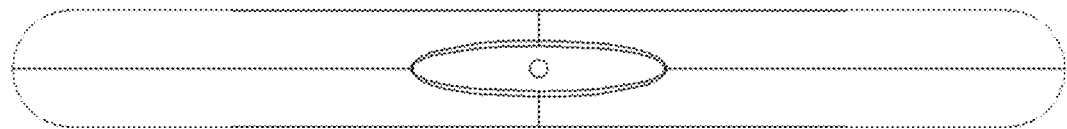
FIG. 43 is a left side view of another embodiment of the floss strip.
Figure 44:
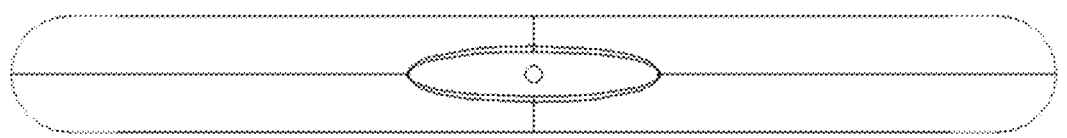
FIG. 44 is a right side view of another embodiment of the floss strip.
Figure 45:
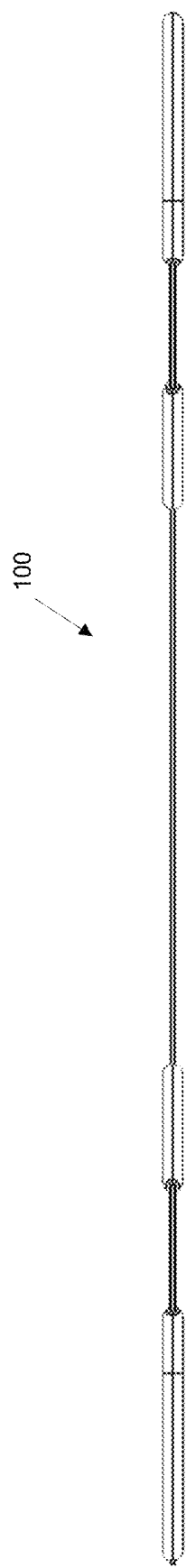
FIG. 45 is a back view of another embodiment of the floss strip.

With reference now to FIGS. 19 through 24 another embodiment of a floss strip 100 is shown. FIG. 19 depicts a perspective view of the floss strip 100 including a flossing filament 102, a first anchor 108, a second anchor 110 and an integral pick 210. FIG. 20 is a top view of the floss strip 100, FIG. 21 is a front view of the floss strip 100, and FIG. 22 is a bottom view of the floss strip 100. FIG. 24 is a left side view of the floss strip 100, and FIG. 23 is a right side view of the floss strip 100. In some embodiments, and as depicted in FIGS. 19 through 24, the first anchor 108 is connected to the second anchor 110 via the flossing element 102, and in some embodiments, the first anchor 108 is connected to the second anchor 110 only via the flossing filament 102.

FIGS. 25 through 38 show embodiments of the floss strip 100 in which the tensioning element 134 comprises a series of beads 300, which beads can have any desired shape including, for example, round, rectangular, square, triangular, polygonal, or the like. In some embodiments, the beads 300 can comprise one or several spheres. In some embodiments, some or all of the beads 300 and/or spheres can be independently coupled to the flossing filament 102.

Some embodiments relate to method of using the floss strip 100 for performing oral hygiene. The method can include, inserting the floss strip 100 into a human mouth. The floss strip 100 can include, as discussed above, a flossing filament 102 having a first end 104, and a second end 106; a first anchor 108 coupled to the flossing filament 102 at the first end 104 of the flossing filament 102; and a second anchor 110 coupled to the flossing filament 102 at the second end 106 of the flossing filament 102, the flossing filament 102 coupling the first and second anchors 108, 110. Independently controlling the first anchor 108 and the second anchor 110 to tension the flossing filament 102, wherein at least a portion of each of the first anchor 108 and the second anchor 110 are in the human mouth. The method can include flossing between teeth in the mouth with the flossing filament 102.

The method can further include deploying a protected pick 210 from the first anchor 108. In some embodiments, deploying the protected pick 210 from the first anchor 108 comprises bending the first anchor 108 to expose a point 212 of the protected pick 210.

Some embodiments relate to method of using the floss strip 100 for maintaining oral hygiene. The method can include, inserting the floss strip 100 into a human mouth. The floss strip 100 can include, as discussed above, a flossing filament 102 having a first end 104, and a second end 106; a first anchor 108 coupled to the flossing filament 102 at the first end 104 of the flossing filament 102; a second anchor 110 coupled to the flossing filament 102 at the second end 106 of the flossing filament 102, the flossing filament 102 coupling the first and second anchors 108, 110, and a tensioning member attached to the flossing filament at an intermediate location between the first anchor and the second anchor. Independently controlling the first anchor 108, the second anchor 110, and the tensioning member 130 to tension the flossing filament 102. In some embodiments, at least a portion of then tensioning member 130 is in the human mouth. The method can include flossing between teeth in the mouth with the flossing filament 102.

In some embodiments, controlling the tensioning member 130 can include flexing the tensioning member 130. In some embodiments, the method further includes displacing the tensioning member 130 along the flossing filament 102 to change a distance between the tensioning member 130 and the first anchor 108.

While various embodiments of present invention have been described, it will be apparent to those of skill in the art that many more embodiments and implementations are possible that are within the scope of this invention. Accordingly, the present invention is not to be limited to the described embodiments.

What is claimed is:

1. A floss strip for oral hygiene, the floss strip comprising:
 a flossing filament comprising a first end, and a second end;
 a first anchor coupled to the flossing filament at the first end of the flossing filament; and
 a second anchor coupled to the flossing filament at the second end of the flossing filament, the second anchor being a unitary member, the flossing filament coupling the first and second anchors, each of the first anchor and the second anchor comprising:
 a gripping portion comprising:
 a first end;
 a top;
 an opposing bottom;
 a first edge extending between the top and the bottom; and
 an opposing second edge extending between the top and the bottom, a distance between the top and the bottom defining a thickness of the gripping portion and a distance between the first edge and the second edge defining a width of the gripping portion, wherein the width of the gripping portion is greater than the thickness of the gripping portion; and
 a tensioning portion attached to the flossing filament and having a coupling portion, a second end, a tensioning width, and a tensioning thickness, the tensioning portion flexibly coupled to the gripping portion at the coupling portion, the tensioning portion configured to tension the flossing filament in a mouth of a patient.

2. The floss strip of claim 1, wherein the tensioning thickness is equal to the thickness of the gripping portion.

3. The floss strip of claim 2, wherein the tensioning width is less than the width of the gripping portion.

4. The floss strip of claim 2, wherein each of the first anchor and the second anchor tapers from the first end to the second end such that both the width of the gripping portion and the tensioning width decreases toward the second end.

5. The floss strip of claim 4, wherein the taper of the gripping portion continues into the tensioning portion.

6. The floss strip of claim 1, wherein the tensioning portion of each of the first anchor and the second anchor comprises at least one flexing feature.

7. The floss strip of claim 6, wherein the at least one flexing feature of each of the first anchor and the second anchor comprises at least one valley extending adjacent to at least one peak.

8. The floss strip of claim 7, wherein tensioning portion comprises a tensioning top; an opposing tensioning bottom; a tensioning first edge extending between the tensioning top and the tensioning bottom; and an opposing tensioning second edge extending between the tensioning top and the tensioning bottom.

9. The floss strip of claim 8, wherein each of the at least one valley and the at least one peak extend around the tensioning portion and across each of the tensioning top, the tensioning bottom, the tensioning first edge, and the tensioning second edge.

10. The floss strip of claim 9, wherein the at least one valley comprises a plurality of valleys, each adjacent pair of the plurality of valleys separated one peak of the at least one peak.

11. The floss strip of claim 10, wherein each of the plurality of valleys extends arcuately across each of the tensioning top and the tensioning bottom.

12. The floss strip of claim 11, wherein each of the plurality of valleys extends arcuately across each of the tensioning first edge and the tensioning second edge.

13. The floss strip of claim 1, wherein the first anchor is only coupled to the second anchor via the flossing filament.

14. The floss strip of claim 1, wherein the first anchor comprises an integral pick.

15. The floss strip of claim 14, wherein the integral pick extends along at least a portion of the first edge.

16. The floss strip of claim 15, wherein the integral pick extends from a flex-channel in the first anchor to a point, the flex-channel extending at least partially from the second edge to the first edge, wherein the flex-channel is configured to allow flexing of the first anchor to expose the point of the integral pick.

17. The floss strip of claim 16, wherein the integral pick is movable from an undeployed position to a deployed position.

18. The floss strip of claim 17, wherein, when the integral pick is in the undeployed position, the point is relatively more proximate to the first end than is the flex channel.

19. The floss strip of claim 1, further comprising an exposed portion of the flossing filament, wherein the exposed portion of the flossing filament extends from the first anchor to the second anchor.

20. The floss strip of claim 19, wherein each of the first anchor and the second anchor have a length of between 1.5 and 4 centimeters, and wherein the exposed portion of the flossing filament has a length of between 2 and 4 centimeters.

* * * * *